May 29, 1945.   L. M. BALLAMY ET AL   2,377,124
VEHICLE WHEEL DRIVING MEANS
Filed July 15, 1943   3 Sheets-Sheet 1
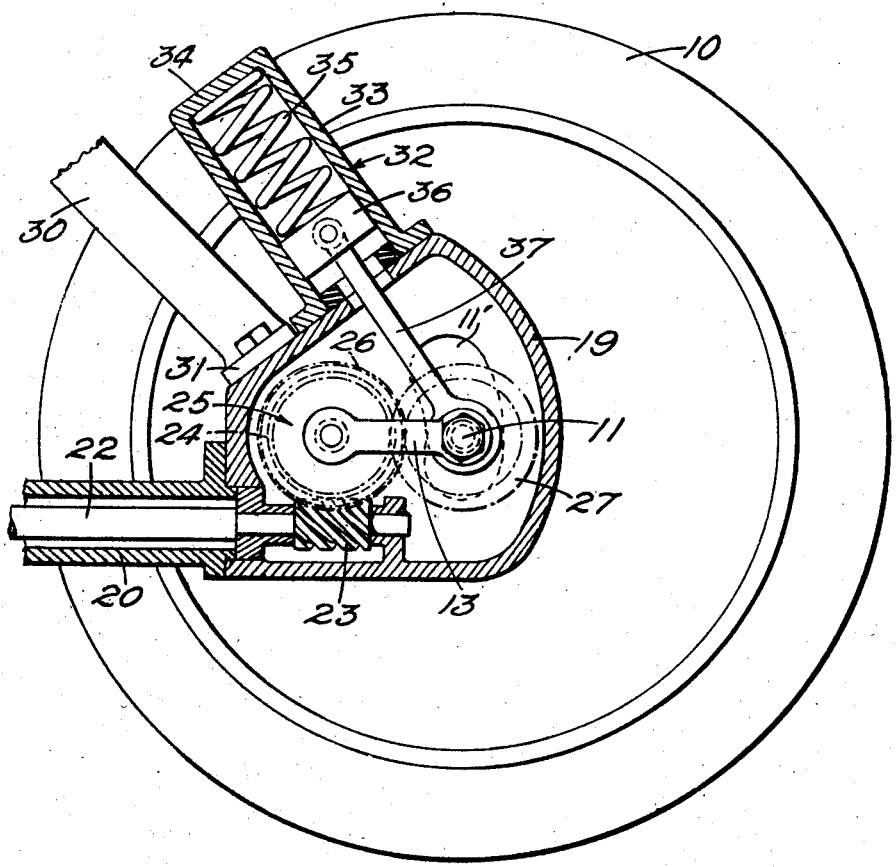
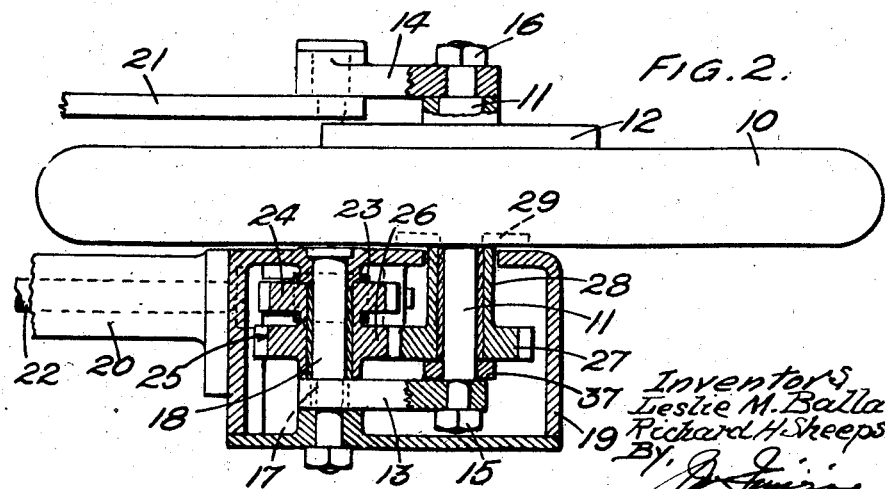

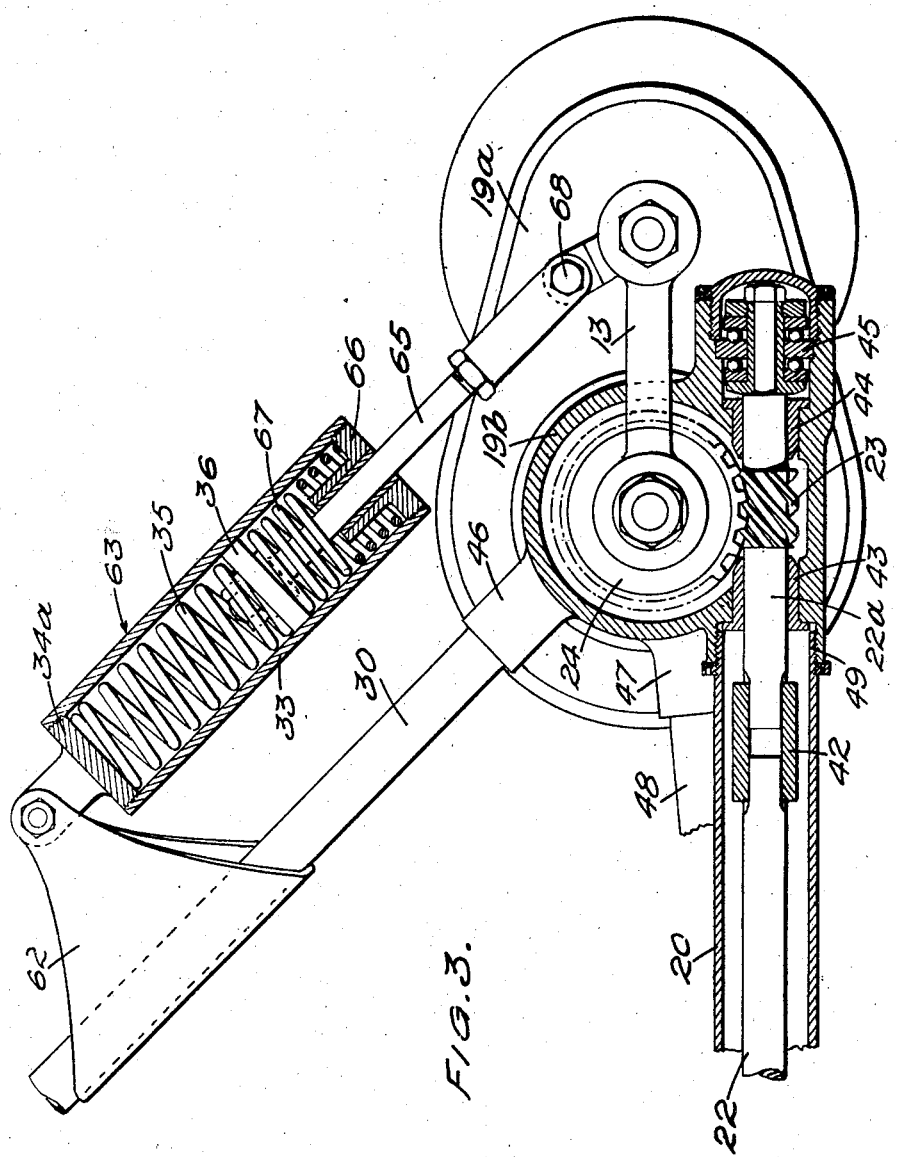

Patented May 29, 1945

2,377,124

UNITED STATES PATENT OFFICE 2,377,124

VEHICLE WHEEL DRIVING MEANS

Leslie Mark Ballamy, Harestone Hill, Caterham, and Richard Hasell Sheepshanks, Eyke, Woodbridge, England, assignors of one-half to G. B. (Nottingham) Limited, Nottingham, England Application July 15, 1943, Serial No. 494,858
In Great Britain July 27, 1942

4 Claims. (Cl. 180—33)

This invention relates to mounting means for a driven wheel of a vehicle, and particularly to means of the kind (hereinafter mentioned as the kind referred to) in which the wheel is mounted upon the free end of an angularly movable arm pivoted to the frame, chassis, body or equivalent of the vehicle so as to allow the wheel to move up and down relative to the vehicle frame or equivalent, resilient means being provided to resist upward movement of the arm, and a rotational drive being imparted to said wheel from an engine or equivalent through the medium of a rotatable driving member which has its axis of rotation substantially coincident with the axis of angular movement of the arm, and which drives the wheel through mechanism carried by the arm.

It is the object of the present invention to provide an improved form and construction of wheel mounting in which the unsprung weight is reduced to a minimum. It will of course be appreciated that in a vehicle having resilient suspension means operatively interposed between the wheel and the vehicle body or equivalent the unsprung weight is usually regarded as being the weight of the wheel and any other parts which are attached thereto in a substantially rigid or unsprung manner, and which therefore partake in the direct vibration caused by inequalities in the road surface. It has long been realised that the weight of the unsprung parts of the vehicle should be reduced to a minimum in order to secure smooth running of the vehicle and to reduce wear of the parts, and the invention sets out to produce this result in a relatively simple and convenient manner.

It is a further object of the invention to provide an improved resilient wheel mounting and driving means for the rear wheel of a motor bicycle.

In a vehicle having wheel mounting means of the kind referred to the present invention is characterised by the fact that the driving member, at the pivotal axis of the arm, is driven by a rotatable shaft which extends forwards from said driving member to a gear box or like driving means, the said shaft having its axis fixed in relation to the frame or equivalent of the vehicle so that the whole of said shaft and its bearings are included in the sprung portion of the vehicle.

There is further provided according to the invention in a vehicle, a wheel mounting means of the kind referred to, wherein the driving member at the pivotal axis of the angularly movable arm comprises a toothed gear wheel which meshes directly with a gear wheel carried upon the vehicle wheel axis and in driving engagement with said vehicle wheel. Preferably the driving force exerted by the said driving member tends to lift the vehicle frame or equivalent, thereby increasing the adhesion between the wheel and the road surface.

As a further aspect of the invention, in a vehicle having wheel mounting means of the kind referred to the arm, with the driving mechanism carried thereby, is movable up and down within a casing which is fixed in relation to the vehicle frame or equivalent and therefore is wholly included in the sprung portion of the vehicle.

The above mounting means can advantageously be used for supporting and driving the rear wheel of a motor bicycle.

In all cases the distance between the vehicle wheel axle and the pivotal axis of the arm is preferably less than the radius of the vehicle wheel, thus enabling said arm to be relatively short and light. Preferably an angularly movable wheel-supporting arm is provided alongside each side of the vehicle wheel, said arms being individually mounted upon the vehicle frame or equivalent and being connected together rigidly by an axle member upon which the vehicle wheel runs. Thus a separate springing device may be provided at each side of the vehicle wheel, said springing device being arranged to exert a downward force upon the corresponding arm.

Where a longitudinal shaft is provided the drive therefrom may be transmitted from the longitudinal shaft to the driving member by means of skew gearing, and in one arrangement the driving member is formed with oblique gear teeth which mesh with a skew "worm" upon the longitudinal shaft and also with a driven gear wheel rotatable as one with the vehicle wheel. If desired the driving member may comprise a wheel formed with two circumferential rows of gear teeth meshing respectively with a driving shaft and with a gear wheel rotating as one with the vehicle wheel, the said driving member being freely rotatable about the mounting axis of the wheel-carrying arm or arms. Conveniently the driving mechanism between the driving member and the vehicle wheel is disposed within a casing which is separate from a pair of angularly movable arms supporting the wheel axle, and which is arranged to move angularly in a free manner about the mounting axis of the arms so as to accommodate itself to up and down movements of the wheel axle; the arms may be disposed outside the movable casing of the said driving mechanism.

The invention is illustrated by way of example in the accompanying diagrammatic drawings, in which:

Figure 1 is a side elevation, partly in section showing one form of mechanism applied to the rear wheel of a motor bicycle;

Figure 2 is a sectional plan corresponding to Figure 1;

Figure 3 is a side elevation of a modified form of wheel mounting and driving mechanism for a motor bicycle.

Figure 4:
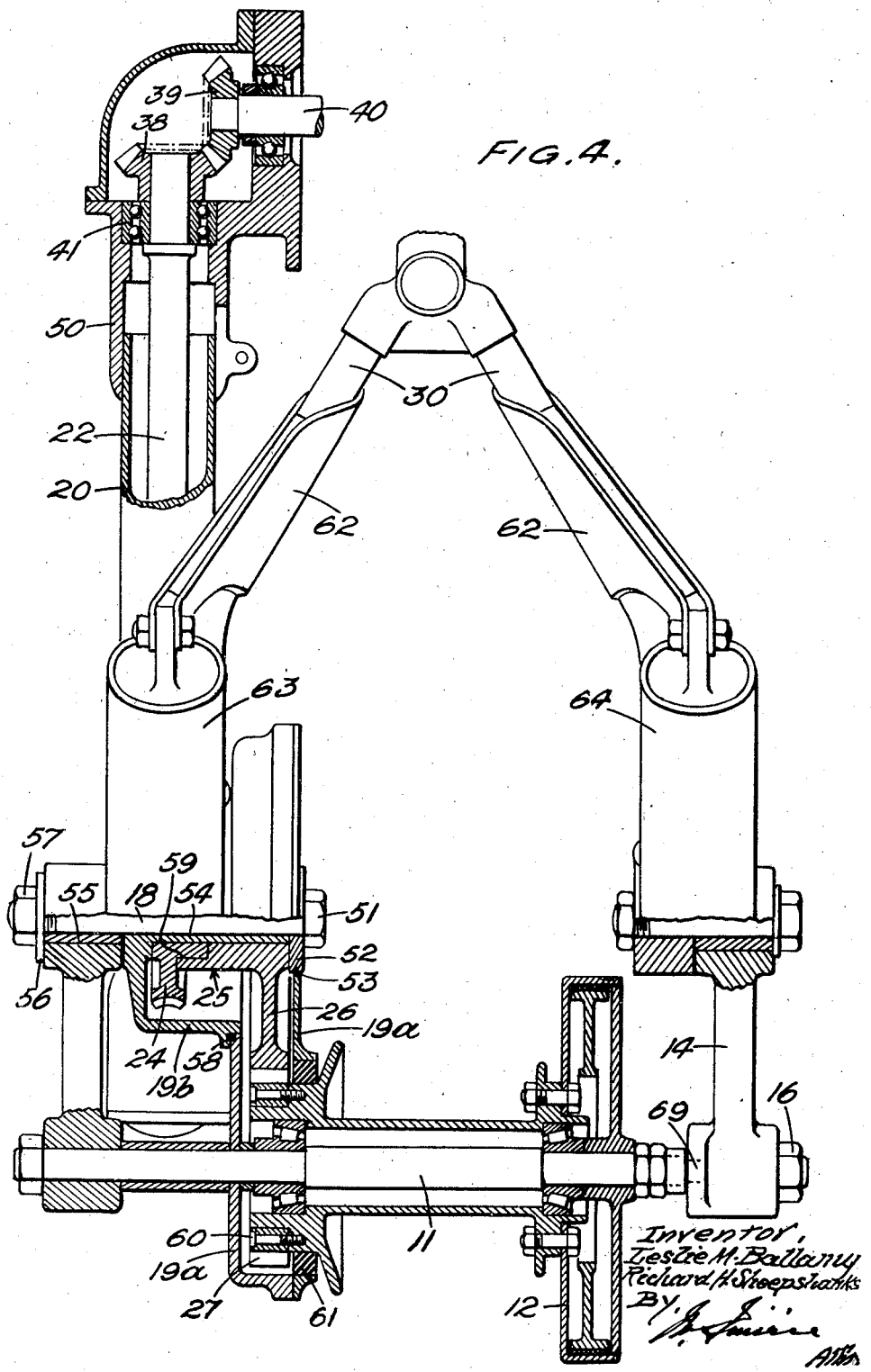
Figure 4 is a plan corresponding to Figure 3 and shown partly in section.

In the construction shown in Figures 1 and 2 the rear wheel of a motor bicycle is indicated at 10 and it is arranged to rotate freely upon the usual wheel axle 11. A drum brake 12 (see Figure 2) has the usual back-plate (not shown) secured non-rotatably to the axle 11 so as to serve as the anchorage for absorbing the braking torque. For supporting the axle 11 a pair of angularly movable arms 13 and 14 are provided, one on each side of the wheel 10, the axle 11 being provided with nuts 15 and 16 which securely clamp the arms 13 and 14 so that the whole constitutes a substantially rigid structure of U shape, as seen in plan. The forward end of the arm 13 is mounted at 17 to pivot freely upon a stub axle 18, which latter constitutes the mounting of the arm 13 and is carried rigidly by a casing 19 forming part of the frame of the motor bicycle. Extending forwardly from the lower part of the casing 19 is a tube 20 corresponding to one of the normal chain stays of the frame, the corresponding member at the opposite side of said frame being indicated at 21. The tube 20 accommodates a driving shaft 22, which extends forwardly from the casing 19 and which, at its forward end, is driven by the usual gear box of the vehicle. The rear end of the shaft 22 is fitted or formed with a skew gear or worm 23 meshing with a gear wheel 24 forming part of a driving member, which latter is indicated generally at 25. This driving member is freely rotatable upon the stub axle 18 and is therefore coaxial with the mounting axis of the arm 13 and also the arm 14. The driving member 25 also comprises a gear wheel 26, which is in permanent mesh with a driven gear wheel 27 adapted to rotate as one with the vehicle wheel 10, owing to the provision of a sleeve 28 which is freely rotatable upon the axle 11, and a fixing flange 29 which is secured to the hub of the wheel 10. One of the usual seat stays of the vehicle frame is indicated at 30 in Figure 1 and is secured rigidly to the casing 19 by means of a flange 31.

The resilient means, which resist upward movement of the wheel 10 relative to the vehicle frame, and which therefore normally take the gravitational load on the wheel, comprises a pair of units but one being shown for convenience in illustration disposed one on each side of the wheel 10. One of these units is indicated at 32 in Figure 1 and comprises a cylindrical casing 33, which is closed at its upper end 34 to form an abutment for a strong coiled compression spring 35. The lower end of the spring 35 bears against a piston or slider member 36, which latter is coupled by a connecting rod 37 with the axle 11, the lower end of the connecting rod 37 being free to move angularly upon said axle. The other resilient unit which is not shown in Figures 1 and 2, is of similar general construction but it has its cylinder attached to the seat stay on that side of the wheel opposite to the seat stay 30. Thus as the axle 11, permitted play through slot 11' in casing 19, moves upwards, for instance on account of a bump in the road surface, the piston or slider member 36 is advanced along the cylinder 33 and compresses the spring 35.

It will be seen that the construction shown in Figures 1 and 2 enables the arms 13 and 14 to be considerably shorter than the radius of the wheel 10, thus reducing the unsprung weight to a very small value, especially in view of the fact that the casing 19 is carried by the frame of the vehicle and therefore can be regarded as "sprung" weight. Moreover the improved arrangement provides an exceptionally efficient drive when travelling over rough surfaces, as the driving member 25 is rotated in a clockwise direction, as seen in Figure 1, and therefore has the tendency to move the arms 13 and 14 in a downward direction at the instant that the wheel encounters a bump, thus momentarily increasing the adhesion between the wheel and the road surface just at the instant when such increased adhesion is most desirable.

In the arrangement shown in Figures 3 and 4 the angularly movable arm 13 is disposed outside the casing, which is indicated at 19a, and the latter is arranged to swing angularly about the axis of the stub axle 18 as the wheel moves up and down. The longitudinal shaft 22 is arranged within a tube 20 constituting part of the vehicle frame, as before, said shaft being provided at its front end with a bevel gear wheel 38 which meshes with a second bevel gear wheel 39 secured to the output shaft 40 of the usual gear box (not shown). The forward end of the shaft 22 is supported in a ball bearing 41, while its rear end is joined by a splined coupling member 42 with a rear shaft 22a supported in bearing bushes 43 and 44 and provided with a two-way thrust bearing assembly 45. The bearings 43, 44 and 45 are fitted into a casing 19b. The casing 19b is formed with sockets 46 and 47, into which one of the seat stays 30 and a forwardly extending frame tube 48 are firmly secured, so that the casing 19b is carried rigidly by the frame of the vehicle. In this case the tube 20 is secured to the casing 19b by a screw thread 49, while its front end fits telescopically into a socket 50 carried by the usual gear box (not shown). The stub axle 18 is in the form of a bolt having under its head 51 a thick washer 52 arranged to fill a circular hole 53 in the casing 19a and serve as a bearing upon which said casing can move angularly. The stub axle 18 also passes through a tube 54 formed in one with the casing 19b and then through a tubular spacing member 55 serving as a bearing for the arm 13. A washer 56 prevents lateral movement of the arm 13 and the whole assembly is secured together by a nut 57. In addition to the bearing at 53 the casing 19a is supported pivotally at 58 by the casing 19b. The gear wheel 26 is secured firmly to the gear wheel 24 by a sleeve joint 59 to form the driving member 25, which latter is rotatably mounted upon the exterior of the tube 54. The gear wheel 26 meshes with the driven wheel 27, which latter is secured to the vehicle wheel by bolts 60. The hub portion of the wheel is engaged by an annular seal 61 fitted into the casing 19a so as to prevent the access of grit and other foreign matter to the gearing.

Lugs 62 secured to the seat stays 30 serve to support the upper ends of a pair of resilient units 63 and 64, each of which is of the general form shown in Figure 3. It comprises a cylinder 33 closed at its upper end by a screw-threaded plug 34a which is secured pivotally to the corresponding lug 62. A piston member 36 has a downwardly extending piston rod 65 which fits slidably within a bush 66 in the lower end closure wall of the cylinder 33. The cylinder space above the piston 36 is occupied by a relatively heavy coiled compression spring 35, while a lighter spring 67 in the lower part of the cylinder 33 serves to cushion the recoil stroke of the unit. In the case of the unit 63 the piston rod 65 is pivoted to the casing 19a at 68, while on the other side of the vehicle the corresponding piston rod has its lower end pivotally connected to a lug 69 upon the rear end of the arm 14.

It will be seen that with the arrangement shown in Figures 3 and 4 up and down movement of the wheel is accompanied by angular movement of the portion 19a of the gear casing, and this enables said casing to be made relatively small and light. The wheel is, of course, maintained in alignment by the arms 13 and 14, which take substantially the whole of the shock loads when the vehicle is running.

It will of course be understood that the arrangements which have been described are given merely by way of example and that various modifications can be made to suit requirements. For instance, it may be desirable in some cases to transmit the drive from the driving member 25 to the wheel by way of three or more gear wheels arranged to mesh in a series, or alternatively the driving member may be connected with the wheel by means of one or more endless chains. Moreover the driving mechanism may be duplicated on the two sides of the wheel. The invention is, of course, applicable to vehicles other than motor bicycles and it can be readily adapted for motor cars and other motor vehicles. In some cases the drive from the longitudinal shaft to the driving member may be effected by a pinion and crown gear or by a bevel gearing.

What we claim is:

1. In a motor cycle rear wheel mounting means, including a casing carried by the frame of the motor cycle, an axle for the rear wheel movable bodily in the casing under similar movements of the rear wheel, an arm pivoted within the casing and connected to and responding to the axle movements, means carried by the casing to yieldingly resist axle movement, and a drive means for the wheel including a driving gear having an axis of rotation substantially coincident with the axis of movement of the arm, a driven gear wheel coaxial with and operative to drive the rear wheel, a tube extending alongside the rear wheel, an engine driven shaft operating in said tube, and a worm on said shaft having driving cooperation with said driving gear wheel.

2. A construction as defined in claim 1, wherein a second gear is provided as a unit with the driving gear and meshes directly with the driven gear on the wheel, and wherein a non-rotatable spindle carried by the frame of the motor cycle supports said unit gear and said arm.

3. A construction as defined in claim 1, wherein a spindle is fixed in the frame of the motor cycle and extends within the casing, and wherein said arm is rotatably mounted on said spindle at one end and rotationally connected to and supports the wheel axle at the other end.

4. A construction as defined in claim 1, wherein the casing for the worm or skew gearing serves as a mounting for an oscillatory casing arranged to enclose the driving and driven gear wheels and to move up and down with the wheel axle.

LESLIE MARK BALLAMY.
RICHARD HASELL SHEEPSHANKS.